United States Patent [19]

Albanese

[11] Patent Number: 4,479,212
[45] Date of Patent: Oct. 23, 1984

[54] CONFERENCE CIRCUIT

[75] Inventor: Andres Albanese, Middletown, N.J.

[73] Assignee: AT&T Bell Laboratories, Murray Hill, N.J.

[21] Appl. No.: 357,773

[22] Filed: Mar. 12, 1982

[51] Int. Cl.³ .............................................. H04J 3/02
[52] U.S. Cl. ................................. 370/62; 179/18 BC
[58] Field of Search ...................... 370/62; 179/18 BC

[56] References Cited

U.S. PATENT DOCUMENTS

| | | | |
|---|---|---|---|
| 3,551,600 | 12/1970 | Berch | 179/18 |
| 3,604,855 | 9/1971 | Pommerening | 179/18 |
| 3,748,394 | 7/1973 | Thomas | 179/18 |
| 3,997,730 | 12/1976 | Stidham | 179/18 |
| 4,109,111 | 8/1978 | Cook | 179/18 |
| 4,160,878 | 7/1979 | Hirschmann et al. | 179/18 |
| 4,162,376 | 1/1979 | Hirschmann et al. | 179/18 |
| 4,224,688 | 9/1980 | Ciancibello et al. | 370/62 |
| 4,360,910 | 11/1982 | Segal et al. | 370/62 |

Primary Examiner—Douglas W. Olms
Assistant Examiner—Kenneth I. Rokoff
Attorney, Agent, or Firm—Sylvan Sherman; Gregory C. Ranieri

[57] ABSTRACT

In a digital, time division multiplex communication system, a first-in, first-out buffer (10) at each subscriber station is employed to establish a conference call. The digital words of the conferees being listened to are entered into the buffer as they are received. They are then read out at a different bit rate such that they all occupy an equal fraction of the word period. The words are decoded in a standard D/A converter (11) and combined in a filter (12).

3 Claims, 6 Drawing Figures

CONFERENCE CIRCUIT

TECHNICAL FIELD

This invention relates to circuits for providing conference call service in digital communications systems.

BACKGROUND OF THE INVENTION

Many switching systems currently available contain a conference call feature which allows three or more stations to be connected together simultaneously so that each can communicate with all of the others. Various techniques for affecting such an arrangement are well known and are described in some detail in U.S. Pat. No. 4,224,688. In general, some means must be provided for combining the several signals so that each conferee can listen to all the other conferees. Typically, this is done by adding the signals from all the conferees and then subtracting that of the listening station. In an analog system this is relatively easy to do. It becomes more difficult in a digital system and, in particular, in nonlinear digital systems.

Alternative approaches involve sampling all the signals and transmitting only the largest one, or scanning to determine which party is speaking. All of these techniques require a considerable investment in equipment which one would prefer to avoid.

SUMMARY OF THE INVENTION

The present invention is based upon the recognition that the digital-to-analog converters currently in use in existing voice systems are underutilized. Typically, it takes approximately twelve microseconds to convert a digital word to its analog equivalent. Inasmuch as each frame of a time division multiplex digital voice system is over 100μs long, the A/D converter is utilized only a small percent of the time. More efficient use is made of the converter, in accordance with the present invention, by sequentially coupling all the digital words being listened to at each station into the A/D converter each frame. More specifically, each receiver extracts the digital words of each of the other conferees and stores them in a first-in, first-out (FIFO) buffer. The words are then read out of the buffer and coupled to the D/A converter at a rate such that each word occupies the same fraction of the total frame period. The converter output, in turn, is passed through a low-pass filter wherein the analog signals are, in effect, summed.

It is an advantage of the present invention that a conferece call can be established without the need of any additional digital operations upon the digital data. Summing of the signals occurs after conversion to analog.

It is a further advantage of the invention that in nonlinear digital systems the need to first convert from nonlinear to linear digital coding is totally eliminated.

It is another advantage of the invention that conference calling can be implemented with the addition of only a FIFO buffer.

DETAILED DESCRIPTION

Figure 1:
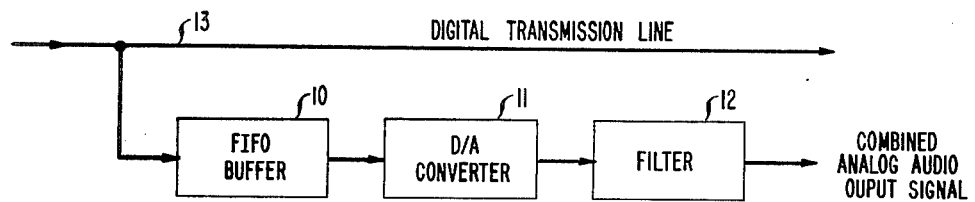
FIG. 1, shows, in block diagram, the portion of a subscriber station adapted for conference calling in accordance with the present invention.

Referring to the drawings, FIG. 1 shows, in block diagram, that portion of the system adapted for conference calling in accordance with the present invention. If the subscriber loop operates in a digital format, the conference circuit can be physically located in the loop at the subscriber's station. If the subscriber loop operates in an analog format, the conference circuit can be located in the central office at the digital analog interface. In either case, the relevant portion comprises, in cascade, a first-in, first-out buffer (FIFO) 10, a digital-to-analog converter 11, and a filter 12. The latter is typically a 4 kilohertz low-pass filter which can be a separate component or can be an integral part of the converter.

In a transmission system to which the invention relates, the signal format employed is one in which the data for the respective conferees is transmitted sequentially. Typical of such signal formats is the time-division multiplex digital (TDM-PCM) signal. Such a signal is characterized by a frame period T which is divided into W words of B bits each. In a typical voice system, a frame of 125μs is divided into 128 eight bit words. When a call is established between two parties, E and F, each party is assigned a time slot for speaking, and each station is adapted to extract from the data stream the particular word assigned to the other party for listening. Thus, if party E is assigned word 5, and party F is assigned word 12, the former listens to whatever is in word 12, and the latter listens to whatever appears in word 5. The message contained in the bits thus recovered by each party is converted to an analog audio signal by the D/A converter 11 and filter 12.

Figure 2:
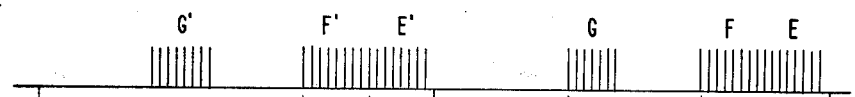
FIGS. 2, 3 and 4 included for purposes of explanation, show the relevant signals associated with a four party conference call for different operating conditions.
Figure 3:
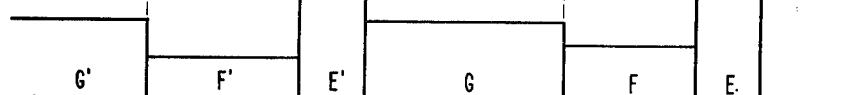
Figure 4:
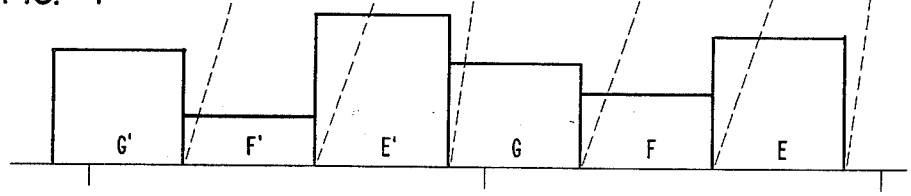

It is apparent that for a two party call, the process is relatively straightforward. However, for a conference call involving three or more parties, some additional apparatus is required at each station for combining or otherwise processing the signals from the other parties. This is accomplished, in accordance with the present invention, by the FIFO buffer 10 which reads and stores a particular sequence of information and then releases it at some later time in the same order in which it was received. In addition, in the instant application, the information is read out of the buffer at a different rate than it is received. The reason for this difference is explained with reference to FIGS. 2, 3 and 4 which show, for purpose of illustration, the relevant signals associated with a four party conference call. More particularly, FIG. 2 shows three words E, F G and E', F', G' associated with three of the conference parties that have been extracted from two adjacent frames 1 and 2, respectively, of the data bit stream at the station of the fourth party to the conference. If these are read out of the buffer at the same rate at which they were written, the output from D/A converter 11 is as shown in FIG. 3 In particular, each output has a magnitude given by the bit information, and a duration which is a function of the distribution of words within each frame. For example, inasmuch as E and F are adjacent words, the converter output for word E persists for only one word period. By contrast, the converter output for words F and G persist for many word periods because of the longer interval between words F and G. The result of this time distortion is a corresponding amplitude distortion of the output signals due to the integrating effect of the filter 12. To avoid this, each word is expanded upon reading so that each occupies an equal fraction of the frame period, as illustrated in FIG. 4. As a result, each word is given equal weight, and the combined signal in the filter output is a true reflection of their relative magnitudes.

Figure 5:
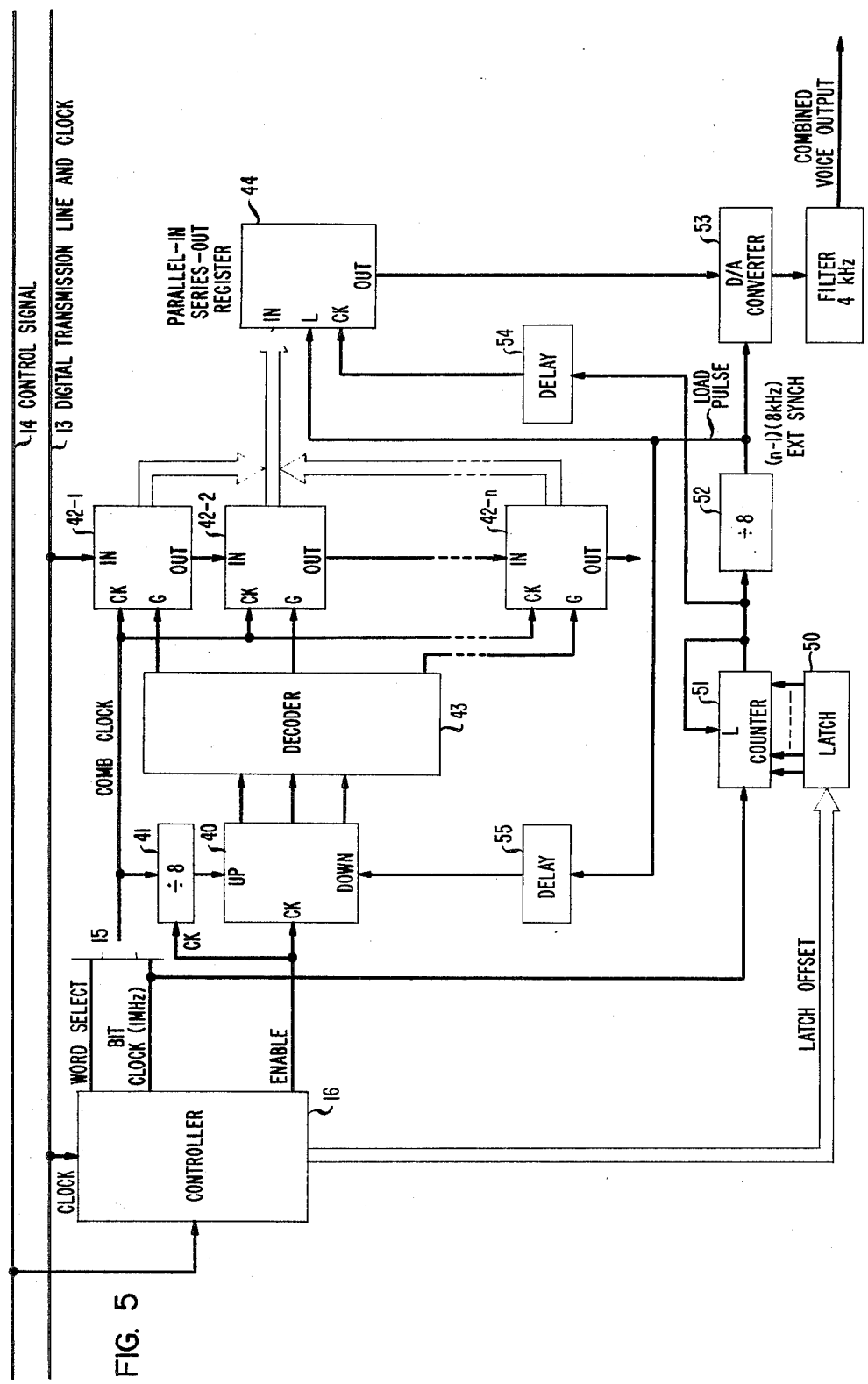
FIG. 5 shows an illustrative embodiment of a FIFO buffer.

FIG. 5 shows an illustrative embodiment of a FIFO buffer for practicing the invention. When the conference call is established, information as to the number of conferees to be listened to (i.e., one less than the total number of conferees, N,), and their assigned word numbers is provided to a controller 16 at each conferee location by the central switcher. The information can be transmitted along a separate control signal line 14, or it can be assigned a word in each frame and transmitted along with the data on line 13. In either case the information includes an enable signal which resets a first counter 40 and a divider 41. Also provided is a bit clock signal and a word select signal. These are combined in an AND-gate to form a comb clock which is used to extract the assigned words from the bit stream. In addition, a second counter 51 is loaded by a latch 50 with a number which depends upon the number of conferees as will be explained in greater detail hereinbelow. In a communication system having distributed intelligence, some of these signals can be locally generated instead of being supplied by the central switcher.

Figure 6:
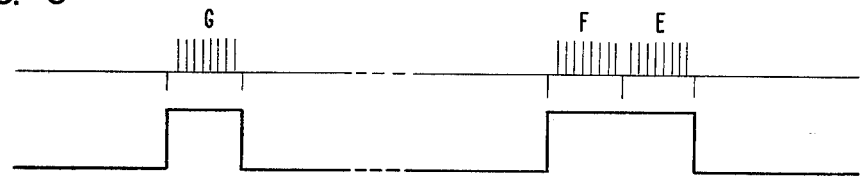
FIG. 6 shows an illustrative comb select signal and word select signal.

FIG. 6 shows an illustrative comb clock signal provided for one of the parties, D, of a four party conference call which includes parties D, E F and G. Using the same signal format described hereinabove, the comb clock comprises eight pulses at the bit rate occurring in word positions E, F and G to which party D is to listen. Also shown is the 1MHz word select signal.

In operation, each of the conferee words E, F and G is clocked into one of a series array of series-in, parllel-out shift registers 42-1, 42-2 ... 42-n. In addition, as each word is entered, counter 40 is incremented. The counter output is decoded in a decoder 43 which generates a gate enable. The latter is coupled to and thereby identifies the particular register containing the first word entered. For example, if the count stored in counter 40 is "2", the decoder points to register 42-2 whose output is then available for loading into a parallel-in, series-out register 43 upon receipt of an appropriate load signal. The latter is derived from a circuit comprising a second counter 51, which is simultaneously receiving bit clock signals, and a divider 52.

As explained hereinabove, the bit rate, R, at which the information is read out of the buffer depends upon the number of conferees. More particularly, with each word containing 8 bits, R is given by $$R = (N-1)(8)/(125 \times 10^{-6}) = (N-1)(64) \text{KHz},$$

where $125 \times 10^{-6}$ seconds is the frame period; and

N the number of conferees.

This signal is obtained from counter 51, which has been previously loaded, by means of a latch 50, with a number that is a function of the number of conferees. To obtain the load signal, the counter output is divided by eight in divider 52. Thus, a load signal, applied to register 43 accepts the word stored in the registers containing the first-in word, as indentified by counter 40. This word is then read out of register at the read rate and applied to the D/A converter where it is converted to its analog equivalent. The output from divider 52 is also applied to counter 40 to decrement the count and, thereby, identify the next word to be read. Suitable delay means 54 and 55 are included, where required, to establish the proper timing.

The above-described process continues with words being introduced into the register at the data bus bit rate and then read out at a rate determined by the number of conferees.

Typically, it takes approximately 12$\mu$s to convert a digital word to its analog equivalent. Thus, for a typical 125$\mu$s frame, ten conferees can be accommodated. On the other hand, the system is equally capable of handling a simple two party call.

An example of a commercially available FIFO sequential memory is the 57401/67401 chip sold by Monolithic Memories of Sunnyvale, Cal.

What is claimed is:

1. A conference call circuit for use in a time-division multiplex digital system in which digital data is transmitted as a data bit stream comprising a sequence of frames, each of which includes W words of B bits each; the system comprising, in cascade,
   a first-in, first-out buffer stage;
   a digital-to-analog converter;
   and a filter;
   and transmission means coupling said system to the input of said buffer stage
   and wherein said buffer stage extracts selected words from said data bit stream at a first bit rate, stores said selected words, and then reads them out at a second bit rate that is lower than said first bit rate.

2. In the conference circuit according to claim 1 wherein a call including N conferees has been established;
   and said stored words are read at a bit rate R equal to $((N-1)B/T)$, where T is the frame period.

3. A conference call circuit for use in a multiple access digital communication system wherein the digital data is transmitted as a bit stream comprising a sequence of frames, each frame including W words of B bits each and having a predetermined frame period, said circuit comprising:
   means for extracting selected digital words from said data bit stream, wherein each selected digital word is representative of one conferee;
   means for storing said selected digital words from the extracting means;
   means for reading said selected digital words from the storing means at a rate such that each word occupies $1/(N-1)$th of the frame period, where N is the number of conferees;
   means for converting said selected digital words read by said reading means from digital to analog form;
   and means for filtering said words from the converting means.

* * * * *